(12) United States Patent
Huang et al.

(10) Patent No.: US 12,352,982 B2
(45) Date of Patent: Jul. 8, 2025

(54) NEAR-TO-EYE DISPLAY DEVICE AND WEARABLE APPARATUS

(71) Applicant: BOE TECHNOLOGY GROUP CO., LTD., Beijing (CN)

(72) Inventors: Haitao Huang, Beijing (CN); Huili Wu, Beijing (CN); Feng Zhang, Beijing (CN); Zhao Cui, Beijing (CN); Yong Yu, Beijing (CN); Chuanxiang Xu, Beijing (CN); Lina Jing, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/765,061

(22) PCT Filed: Apr. 30, 2021

(86) PCT No.: PCT/CN2021/091575
§ 371 (c)(1),
(2) Date: Mar. 30, 2022

(87) PCT Pub. No.: WO2022/227025
PCT Pub. Date: Nov. 3, 2022

(65) Prior Publication Data
US 2024/0053514 A1    Feb. 15, 2024

(51) Int. Cl.
*G02B 3/00* (2006.01)
*G02B 27/01* (2006.01)

(52) U.S. Cl.
CPC ....... *G02B 3/0037* (2013.01); *G02B 27/0172* (2013.01)

(58) Field of Classification Search
CPC ... G02B 27/00–0189; G02B 2027/0105–0198; G02B 3/00–14
See application file for complete search history.

(56) References Cited

U.S. PATENT DOCUMENTS

| 6,215,593 B1 | 4/2001 | Bruce |
| 2009/0231698 A1* | 9/2009 | Hashimoto ........ G02B 27/0101 359/476 |

(Continued)

FOREIGN PATENT DOCUMENTS

| CN | 105008983 A | 10/2015 |
| CN | 208444095 U | 1/2019 |

(Continued)

OTHER PUBLICATIONS

China Patent Office, First Office Action dated Oct. 31, 2024, for corresponding Chinese application 202180000999.8.

(Continued)

*Primary Examiner* — Christopher A Lamb, II
(74) *Attorney, Agent, or Firm* — HOUTTEMAN LAW LLC (57) ABSTRACT

A near-to-eye display device and wearable apparatus are provided. The near-to-eye display device includes: pixel islands and micro-lenses in one-to-one correspondence with the pixel islands; wherein each pixel island emits light to a corresponding micro-lens so that the light reaches a predetermined viewing position after passing through the corresponding micro-lens. The near-to-eye display device further includes: super-lens units each including at least one super-lens; wherein the super-lens units are in one-to-one correspondence with the pixel islands; each super-lens unit is on a side of a corresponding pixel island proximal to the corresponding micro-lens, and an orthogonal projection of the super-lens unit on a plane where the corresponding pixel island is located covers the corresponding pixel island. The super-lens unit converges light, which is within a predetermined angle, emitted by the corresponding pixel island, to reduce a diffusion angle of the light emitted by the corresponding pixel island.

20 Claims, 3 Drawing Sheets

(56) References Cited

U.S. PATENT DOCUMENTS

| | | | |
|---|---|---|---|
| 2013/0286053 A1* | 10/2013 | Fleck | G09G 5/377 |
| | | | 345/82 |
| 2014/0177032 A1 | 6/2014 | Woodgate et al. | |
| 2017/0322418 A1* | 11/2017 | Lin | G02B 5/30 |
| 2018/0348548 A1* | 12/2018 | Visser | G02B 5/1885 |
| 2019/0219827 A1 | 7/2019 | Park et al. | |
| 2019/0377067 A1* | 12/2019 | Han | G01S 7/4815 |
| 2020/0117009 A1 | 4/2020 | Chuang et al. | |
| 2020/0225487 A1 | 7/2020 | Jiang | |

FOREIGN PATENT DOCUMENTS

| | | |
|---|---|---|
| CN | 109557666 A | 4/2019 |
| CN | 209281075 U | 8/2019 |
| CN | 110376665 A | 10/2019 |
| CN | 111045210 A | 4/2020 |
| CN | 111679432 A | 9/2020 |
| CN | 112054131 A | 12/2020 |
| CN | 112394512 A | 2/2021 |
| TW | 201937235 A | 9/2019 |
| WO | WO2020080022 A1 | 4/2020 |

OTHER PUBLICATIONS

China Patent Office, OA2 dated Feb. 20, 2025, for corresponding CN application No. 202180000999.8.

* cited by examiner

NEAR-TO-EYE DISPLAY DEVICE AND WEARABLE APPARATUS

CROSS-REFERENCE TO RELATED APPLICATIONS

This is a National Phase application filed under 35 U.S.C. 371 as a national stage of PCT/CN2021/091575 filed on Apr. 30, 2021, the content of which is incorporated herein by reference in its entirety.

TECHNICAL FIELD

The present disclosure relates to the field of near-eye display technology, in particular to a near-to-eye display device (which may also be referred to as a near eye display device or a near-eye display device) and a wearable apparatus.

BACKGROUND

In recent years, near-to-eye display technologies are rapidly developing, among which Virtual Reality (VR) and Augmented Reality (AR) technologies are most representative, and provide excellent audio-visual experience to people. Each of the near-to-eye display technologies can project an image directly into eyes of a viewer, thereby obtaining an immersive display experience. In practical applications, a crosstalk easily occurs in light emitted by different portions of a near-to-eye display device.

SUMMARY

Some embodiments of the present disclosure provide a near-to-eye display device and a wearable apparatus.

A first aspect of the present disclosure provides a near-to-eye display device including: a plurality of pixel islands and a plurality of micro-lenses in one-to-one correspondence with the plurality of pixel islands; wherein each pixel island is configured to emit light to the corresponding micro-lens so that the light reaches a predetermined viewing position after passing through the corresponding micro-lens; wherein the near-to-eye display device further includes:

a plurality of super-lens units each including at least one super-lens; wherein the plurality of super-lens units are in one-to-one correspondence with the plurality of pixel islands; each super-lens unit is on a side of a corresponding pixel island proximal to the corresponding micro-lens, and an orthogonal projection of the super-lens unit on a plane where the corresponding pixel island is located covers the corresponding pixel island; the super-lens unit is configured to converge light emitted by the corresponding pixel island, so as to reduce a diffusion angle of the light emitted by the corresponding pixel island.

Optionally, each super-lens unit includes a plurality of super-lenses, each pixel island includes a plurality of pixel units, and the plurality of super-lenses are in one-to-one correspondence with the plurality of pixel units.

Optionally, each super-lens includes: a base substrate, and a plurality of nano-pillars on the base substrate; a height-to-width ratio of each of the nano-pillars is in a range from 3:1 to 12:1.

Further, optionally, the height-to-width ratio of each of the nano-pillars is 5:1.

Further, optionally, the nano-pillars each have a height in a range from 350 nm to 550 nm and a radius in a range from 45 nm to 95 nm.

Optionally, each super-lens has a refractive index greater than 1.7.

Further, optionally, a material of the nano-pillars includes silicon nitride.

Optionally, the near-to-eye display device further includes a transparent substrate, wherein the plurality of pixel islands and the plurality of micro-lenses are respectively fixed on two opposite sides of the transparent substrate; and the super-lenses are on a side of the transparent substrate proximal to the plurality of pixel islands.

Optionally, the plurality of super-lens units are arranged in an array; the plurality of micro-lenses are arranged in an array; a distance between any adjacent two of the plurality of micro-lenses is between 0 mm and 10 mm; and a distance between two adjacent micro-lenses in a same column is between 0 mm and 10 mm.

Optionally, a diameter of each of the micro-lenses is in a range from 30 μm to 10 mm.

Optionally, a distance between each pixel island and the corresponding micro-lens does not exceed a focal length of the corresponding micro-lens.

Optionally, each pixel unit includes an organic light-emitting diode device or a micro-light emitting diode device.

Optionally, the near-to-eye display device further includes: a base substrate; the micro-lenses are on a side of the base substrate distal to the pixel islands.

Optionally, the micro-lenses and the base substrate have a one-piece structure.

A second aspect of the present disclosure provides a wearable apparatus, including any one of the above near-to-eye display devices.

BRIEF DESCRIPTION OF DRAWINGS

Drawings, which are included to provide a further understanding of the present disclosure and constitute a part of this specification, illustrate the present disclosure together with the detailed description, but do not limit the present disclosure. In the drawings.

DETAIL DESCRIPTION OF EMBODIMENTS

To make the objects, technical solutions and advantages of the embodiments of the present disclosure more clear, the technical solutions of the embodiments of the present disclosure will be clearly and completely described below with reference to the drawings of the embodiments of the present disclosure. Obviously, the described embodiments are only a few (not all) embodiments of the present disclosure. All other embodiments, which may be derived by a person ordinarily skilled in the art from the described embodiments of the present disclosure without inventive effort, are within the scope of protection of the present disclosure.

The terms used herein to describe embodiments of the present disclosure are not intended to limit and/or define the scope of the present disclosure. For example, unless defined otherwise, technical or scientific terms used in the present disclosure should have a common meaning as understood by a person ordinarily skilled in the art to which this invention belongs. It should be understood that terms "first", "second" and the like, as used in the present disclosure, do not denote any order, quantity, or importance, but rather are used to distinguish one element from another. The singular form "a," "an," "the," or the like does not denote a limitation of the number of items, but rather denotes the presence of at least one item, unless clearly defined in the context otherwise.

The present disclosure will be described in more detail below with reference to the accompanying drawings. Like elements are denoted by like reference symbols throughout the drawings. For purposes of clarity, features in the drawings are not necessarily drawn to scale. Moreover, certain well-known elements may not be shown in the drawings.

Numerous specific details of the present disclosure, such as structures, materials, dimensions (or sizes), processing techniques and technologies of the components, are set forth in the following description in order to provide a more thorough understanding of the present disclosure. However, as will be understood by one of ordinary skill in the art, the present disclosure may be practiced without these specific details.

At present, mainstream near-to-eye display technologies include: waveguide display technology, free-form surface display technology, integrated imaging optical field display technology, and micro-lens-pixel island image surface stitching display technology. The waveguide display is sensitive to the wavelength of incident light, such that dispersion is easy to occur, and a phenomenon such as "ghost images" and the like may occur in a wearing process. In the free-form surface display technology, an overall size of an apparatus is large, and it is difficult to achieve a trade-off between a large field angle and the size of the apparatus. For the integrated imaging optical field display, it is difficult to realize a transmission of external light, and the augmented reality display effect is poor. By attaching micro-lenses to regional micro display pixel islands, displaying a part of sub-images in the whole image by each micro-lens-pixel island combination, and completely projecting the whole image into human eyes through image surface stitching, the micro-lens-pixel island image surface stitching display technology can bring the user a wider visual experience, and is beneficial to realizing lightness and thinness of the apparatus, such that the micro-lens-pixel island image surface stitching display technology becomes an important display technology in the field of augmented display/virtual display in future.

Figure 1:
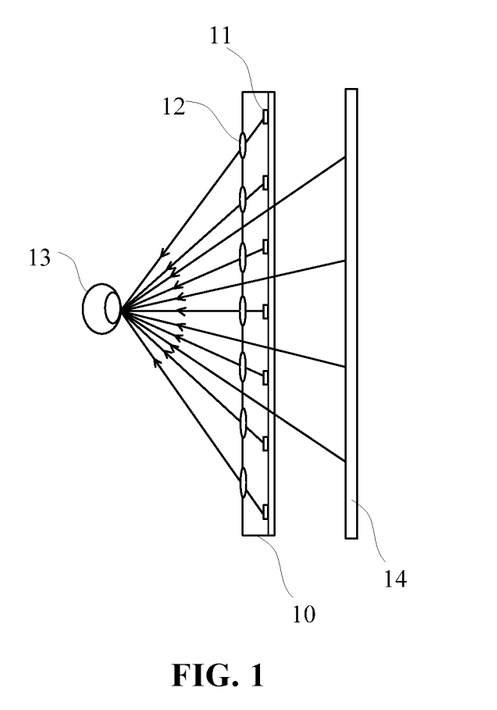
FIG. 1 is a schematic structural diagram of a near-to-eye display device using a micro-lens-pixel island image surface stitching display technology in the related art.

FIG. 1 is a schematic structural diagram of a near-to-eye display device using a micro-lens-pixel island image surface stitching display technology in the related art. As shown in FIG. 1, the near-to-eye display device using the micro-lens-pixel island image surface stitching display technology includes: a plurality of micro-lenses disposed on one side of a transparent substrate 10 and a plurality of pixel islands disposed on the other side of the transparent substrate, wherein the pixel islands are in one-to-one correspondence with the micro-lenses. Each pixel island 11 corresponds to a small display screen. The micro-lenses are used for imaging, and light emitted by a pixel island 11 passes through the micro-lens 12 corresponding to the pixel island 11, and then enters a human eye 13, such that the human eye 13 may see (or view) a displayed image. The displayed image seen by the human eye 13 is an enlarged virtual image, which is located at a depth of field on a side of the pixel island array 11 distal to the micro-lenses 12. In addition, there is a gap between any two adjacent pixel islands of the plurality of pixel islands 11, and there is a gap between any two adjacent micro-lenses of the plurality of micro-lenses 12, and ambient light may enter the human eye 13 through the gaps between the pixel islands 11 and the gaps between the micro-lenses 12, such that the human eye 13 may see the image displayed by the pixel islands 11 and an external object 14 at the same time, thereby achieving the augmented reality display.

Figure 2:
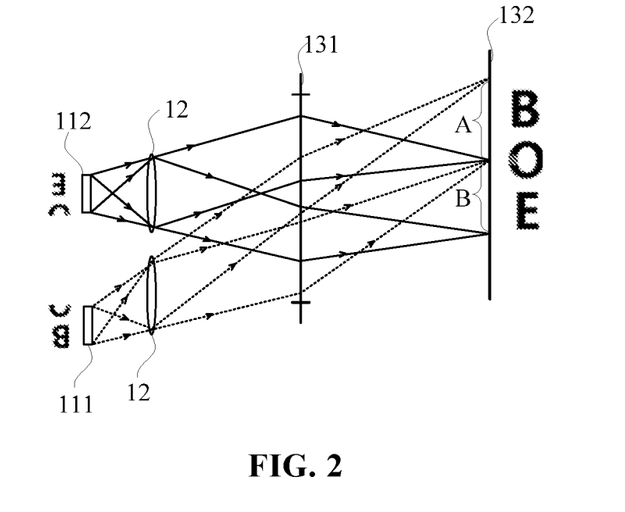
FIG. 2 is a schematic diagram illustrating a principle of displaying an image by stitching different pixel islands of a near-to-eye display device.

The principle of stitching display images of different pixel islands 11 is: light emitted by each pixel unit (e.g., sub-pixel) on each pixel island 11 is refracted by the corresponding micro-lens 12 to form a beam of parallel light which is emitted to the eye lens and then converged on the retina. For the human eye 13, after two beams of parallel light with a certain width and the same angle enter the human eye 13, the two beams of parallel light are converged at a same point on the retina; parallel light incident at different angles will converge at different points on the retina. Therefore, by properly controlling the angle of light incident on the eye lens, the images displayed by different pixel islands 11 may be stitched (or spliced) together on the retina. FIG. 2 is a schematic diagram illustrating a principle of stitching display images from different pixel islands of a near-to-eye display device. FIG. 2 only illustrates the principle of stitching display of two pixel islands 111 and 112. It should be understood that in practical applications, the display may be performed by stitching more pixel islands. In order to more clearly represent a schematic optical light diagram of the light emitted from the two pixel islands 111 and 112, the light emitted from the pixel island 111 and the light emitted from the pixel island 112 in FIG. 2 are represented by solid lines and dotted lines, respectively. As shown in FIG. 2, the pixel island 111 displays an inverted letter "B" and a part of an inverted letter "O", and the pixel island 112 displays another part of the inverted letter "O" and an inverted letter "E". The light emitted by the pixel island 111 passes through the corresponding micro-lens 12 and the eye lenses 131 and then falls on an area A of the retina 132, and the light emitted by the pixel island 112 passes through the corresponding micro-lens 12 and the eye lenses 131 and then falls on an area B of the retina 132, such that an upright (e.g., non-inverted) "BOE" pattern is stitched on the retina 132.

In some embodiments, the plurality of pixel islands 11 in the pixel island array may emit light having a plurality of different colors, such as, red, blue, and green (for convenience of description, a pixel island emitting red light is hereinafter referred to as a "red pixel island", a pixel island emitting green light is hereinafter referred to as a "green pixel island", and a pixel island emitting blue light is hereinafter referred to as a "blue pixel island"). A target image to be displayed may be regarded as an overlay (or a superposition) of a red component image, a green component image, and a blue component image. When the near-to-eye display device performs a display, each red pixel island 11r displays a part of the red component image, each green pixel island 11g displays a part of the green component image, and each blue pixel island displays a part of the blue component image. The images displayed by all the red pixel islands 11r may be stitched to form the red component image, the images displayed by all the green pixel islands 11g may be stitched to form the green component image, and the images displayed by all the blue pixel islands may be stitched to form the blue component image. The red component image, the green component image and the blue component image are overlaid on the retina of the human eye 13 to form a complete target image.

Figure 3:
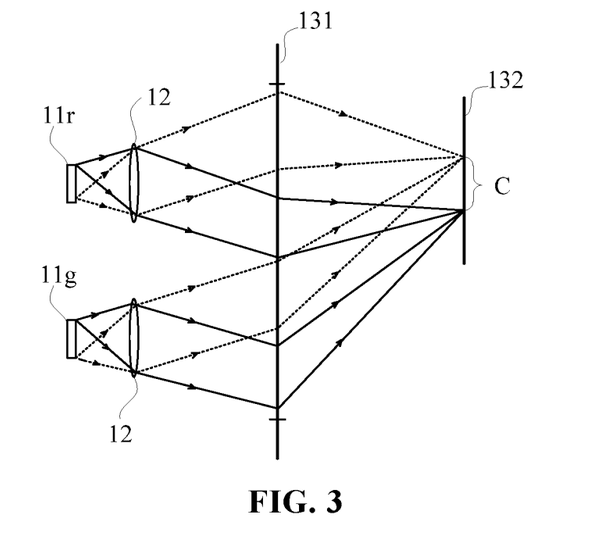
FIG. 3 is a schematic diagram illustrating a principle that images displayed by red and green pixel islands of a near-to-eye display device are overlaid (or superposed) on a retina.
Figure 4:
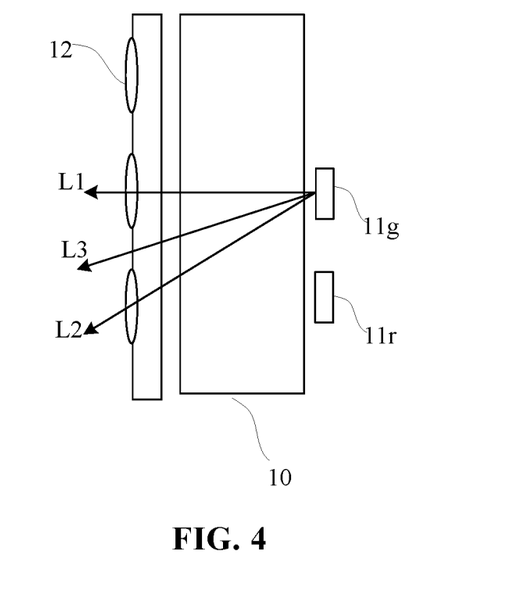
FIG. 4 is a schematic diagram illustrating a crosstalk phenomenon of light occurring in a near-to-eye display device.

Referring to FIG. 1, all the pixel islands 11 in FIG. 1 may be divided into a plurality of groups, each group includes one red pixel island 11r, one green pixel island 11g and one blue pixel island, and images displayed by the three pixel islands 11 in a same group fall on a same area on the retina 132 to achieve an overlay effect, such that a viewer sees the overlaid image. That is, the red component image, the green component image and the blue component image are overlaid on the retina of the human eye 13. FIG. 3 is a schematic diagram illustrating the principle that images displayed by red and green pixel islands 11r and 11g of a near-to-eye display device are overlaid on a retina. FIG. 3 only illustrates the principle of the overlay of the images of the red pixel island 11r and the green pixel island 11g. It should be understood that in practical applications, the images displayed by three pixel islands 11 in a same group are overlaid with each other. As shown in FIGS. 1 and 3, the light emitted by the red pixel island 11r passes through the corresponding micro-lens 12 and the eye lens 131 and then falls on an area C on the retina 132, and the light emitted by the green pixel island 11g passes through the corresponding micro-lens 12 and the eye lens 131 and then also falls on the area C on the retina 132, such that the images displayed by the red pixel island 11r and the green pixel island 11g are overlaid with each other in the area C. However, in the near-to-eye display device shown in FIG. 1, the display in FIG. 1 also has some limitations. Since an angle of light emitted by each pixel island 11 is large, a crosstalk phenomenon will occur in light with different colors, which causes a poor imaging effect and affects user experience. FIG. 4 is a schematic diagram illustrating a crosstalk phenomenon of light of different colors occurring in the near-to-eye display device. As shown in FIG. 4, a part of light L1 emitted from the green pixel island 11g will irradiate on the micro-lens 12 corresponding to the green pixel island 11g, and enter the human eye, and the part of light is effective light required for imaging. In addition, a part of the light L2 will irradiate on an adjacent micro-lens 12, and this part of the light will overlay crosstalk of a different color on the resultant image, such that the viewed image has an uneven color distribution. In addition, a part of the light L3 may irradiate on a transparent area between the above two micro-lenses 12, which causes light leakage, and in this case, a bright light ring may be overlaid around the image seen by the user, which affects the user experience.

In other embodiments, each pixel island in the pixel island array may emit light of different colors. Each pixel island includes a plurality of pixel units emitting different colors (e.g., a pixel island emitting light of a plurality of different colors is referred to as a "full-color pixel island"). Specifically, the pixel units of different colors (i.e., the pixel units emitting different colors) may be arranged in an array. For example, a row of red pixel units (or sub-pixels), a row of green pixel units, and a row of blue pixel units sequentially arranged in a column direction form a pixel unit group, and each pixel island includes one or more pixel unit groups. It should be noted that when each pixel island is a full-color pixel island, colors of the light emitted from the pixel units of the pixel island include, but are not limited to, red, green, blue, and the like, and may also include white, yellow, and the like. When the near-to-eye display device performs a display, the pixel units of various colors of each pixel island respectively display component images of different colors, and in this case, each pixel island is equivalent to a small full-color display screen and directly displays a part of an image. Such a near-to-eye display device also has a problem of light leakage or color crosstalk due to stray light of a large light emitting angle of the pixel island.

In some embodiments of the present disclosure, the plurality of micro-lenses 12 form a micro-lens array, and the plurality of micro-lenses 12 are arranged in a plurality of rows and a plurality of columns.

The plurality of pixel islands 11 form a pixel island array; the pixel islands 11 are in one-to-one correspondence with the micro-lenses 12; and each pixel island is configured to emit light to the corresponding micro-lens 12 such that the light reaches a predetermined viewing position after passing through the micro-lenses 12. The predetermined viewing position is a position where eyes of a user are located, when the user uses the near-to-eye display device. The plurality of pixel islands 11 of the pixel island array emit light of (or having or with) a plurality of colors. For example, each of the plurality of pixel islands of the pixel island array may emit red, green, and blue light (and the pixel island is the full-color pixel island). For another example, the plurality of pixel islands 11 of the pixel island array are divided into a plurality of groups, each group includes three pixel islands 11, and the three pixel islands 11 in the same group emit red, green, and blue light, respectively, so that the plurality of pixel islands 11 of the pixel island array emit light of three colors. For another example, each group includes four pixel islands 11, and the four pixel islands 11 in the same group emit red, green, blue, and yellow light, respectively, so that the plurality of pixel islands 11 of the pixel island array emit light of four colors.

The near-to-eye display device provided by the embodiment of the present disclosure further includes: a plurality of super-lens units 3, each super-lens unit 3 including at least one super-lens; the super-lens units 3 are in one-to-one correspondence with the pixel islands; the super-lens units 3 are arranged at a side close to the corresponding micro-lenses, respectively, and a projection of a super-lens unit 3 on a plane where the corresponding pixel island is located covers the corresponding pixel island; each super-lens unit 3 is configured to converge light, which is within a predetermined angle, emitted by the corresponding pixel island to reduce a diffusion angle of the light emitted by the corresponding pixel island.

Each super-lens unit 3 may correspond to a single-color pixel island or a full-color pixel island. The super-lens units 3 are in one-to-one correspondence with the pixel islands, which means that the projection of a super-lens unit 3 on the plane where the corresponding pixel island is located covers the corresponding pixel island, so that the light emitted by each pixel unit in a pixel island may substantially enter the corresponding super-lens, and the light emitted by the pixel islands is converged by the respective super-lens units.

Figure 5:
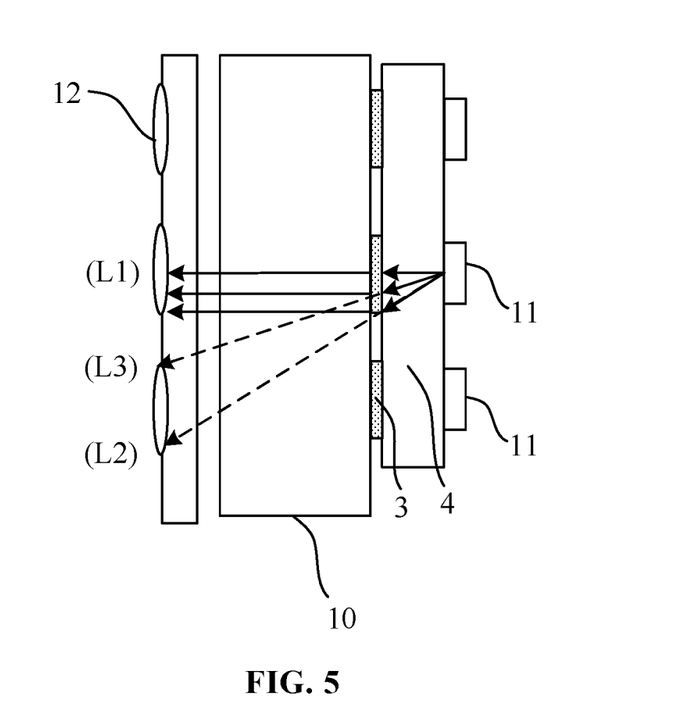
FIG. 5 is a schematic diagram of light transmission in a near-to-eye display device provided in some embodiments of the present disclosure.

The embodiments of the present disclosure may avoid the crosstalk of the colors of light emitted from the pixel islands 11 of different colors by providing the super-lens units 3. Referring to FIG. 5, light emitted from each pixel island passes through the corresponding super-lens unit 3 and then enters the corresponding micro-lens. The light emitted by each pixel island is emitted at a Lambertian angle, the light emitting angle is large, and the corresponding super-lens unit 3 may converge the light with a large angle, so that a light diffusion range thereof is reduced. Therefore, after light emitted by each pixel island pass through the corresponding super-lens unit 3, when entering the corresponding micro-lens, the light diffusion angle of the light is relatively small; and besides normal light for imaging, no stray light substantially diffuses around the light emitted by each pixel island, so that transparent stray light cannot be formed in transparent areas among different micro-lenses, and the light emitted from one peripheral pixel island cannot diffuse into the micro-lenses corresponding to other peripheral pixel islands. In this way, light leakage cannot occur, and further, stray light with the crosstalk cannot occur, thereby improving the imaging effect of the micro-lenses at the predetermined position, and improving the display performance of the near-to-eye display device.

Specifically, referring to FIG. 5, the light emitted from each pixel island is divergent but mainly within in a certain angle range. In the embodiment of the present disclosure, the predetermined angle refers to an angle range within which the light from each pixel island or each pixel unit is, and the angle range is defined by both the imaging light and the stray light. A light outside this range may pass through adjacent pixel islands but will have substantially no effect on the display due to its low brightness. In the embodiment of the present disclosure, the super-lens is arranged on a side of a light outgoing surface of each pixel island close to (or proximal to) the corresponding micro-lens unit, so as to converge the light emitted by the pixel island. Because the light emitted by the pixel island is divergent and passes through layers such as a protective layer and an encapsulation layer 4 before reaching the super-lens unit, when reaching the super-lens unit, the light is diffused at a certain angle. Therefore, an area of each super-lens unit is slightly greater than that of the corresponding pixel island, so that the light in the predetermined angle may be converged.

In the embodiment of the present disclosure, each super-lens generally has a higher refractive index, and may have a periodic nano-scale structure formed by performing exposure, development and the like on an electron beam photosensitive material; and a light transmittance of the periodic nano-scale structure to the whole band of visible light is between 80% and 100%, which is higher than the light transmittance of conventional light modulation structures such as a polarizer, a light filter and the like in the prior art, so that each super-lens has a better light outgoing effect, thereby improving the light outgoing efficiency of the display device. In addition, referring to table 1 below, compared with the technical solution in the prior art in which the structures, such as a light filter and a light shielding layer, are used to block the light emitted from a pixel island to the corresponding micro-lens, in the embodiment of the present disclosure, the stray light is not blocked, but the surrounding light within a large angle is converged, so that the transparent stray light and the stray light with the crosstalk which may be formed due to the divergence are used as normal imaging light, thereby effectively ensuring the utilization rate of the light emitted from each pixel island and improving the display brightness.

TABLE 1

Comparison between light-emitting effects of near-to-eye display devices

| Angle of light | Irradiance Without super-lens | Irradiance With super-lens | Contrast ratio | Permeability | Efficiency improvement |
|---|---|---|---|---|---|
| 10° | 0.0254 | 0.0533 | 2.0984 | 0.86 | 79.74% |
| 20° | 0.0899 | 0.1754 | 1.9511 | 0.86 | 67.7% |
| 30° | 0.1719 | 0.3197 | 1.8598 | 0.86 | 59.94% |

Each super-lens may be planarized by including a micro-nano structure such as a nano-pillar 32, and has a convergence effect similar to that of a geometric lens. In addition, each super-lens is a nano-scale device, and thus has a small thickness, so that the light and thin requirements of the near-to-eye display device can be met.

Figure 6:
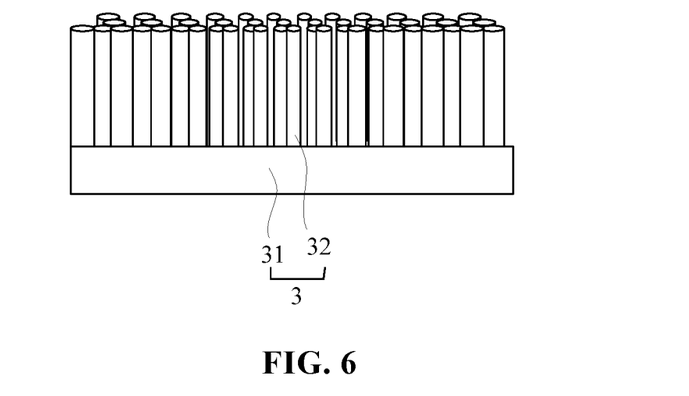
FIG. 6 is a schematic structural diagram of a super-lens provided in some embodiments of the present disclosure.

Specifically, in some embodiments, each super-lens includes: a base substrate 31, a plurality of nano-pillars 32 disposed on the base substrate 31. Compared with the traditional geometric optical lens in which a phase of incident light is adjusted only through a change in a thickness of glass to realize focusing, the super-lens, which is a super surface lens, is an ultra-thin two-dimensional array plane consisting of a list of artificial micro-structures with sub-wavelengths, and has the characteristics of relatively simple manufacturing process, relatively low loss, small volume, small thickness and the like, and may realize flexible and effective regulation and control on the amplitude, the phase, the propagation mode, the polarization state and the like of electromagnetic waves by selecting and setting the specification for the nano-pillars 32. Each nano-pillar 32 is a nano-scale pillar-shaped structure with different radii at two ends, and the material thereof generally includes silicon nitride ($Si_3N_4$), titanium dioxide ($TiO_2$), or the like. Referring to FIG. 6, in the micro-lens, a plurality of nano-pillars 32 with different height-to-width ratios (which may also be referred to as aspect ratios) are provided, and orientations of the wide ends (i.e., ends each having a great radius) and the narrow ends (i.e., ends each having a small radius) of the nano-pillars 32 are designed, so as to form the super-lens meeting the light convergence requirement. Specifically, in the micro-lens, the nano-pillars 32 may include upright structures and inverted structures and may be mixed and arranged alternately. The upright structures and the inverted structures are for distinguishing the nano-pillars 32 with wide ends proximal to the base substrate 31 from the nano-pillars 32 with narrow ends proximal to the base substrate 31. One type of the nano-pillars 32 with wide ends proximal to the base substrate 31 and the nano-pillars 32 with narrow ends proximal to the base substrate 31 may be regarded as having the upright structures, and the other type thereof may be regarded as having the inverted structures. Not only the nano-pillars 32 may include the upright structures and the inverted structures and may be mixed and arranged alternately, but also the height-to-width ratios of the nano-pillars 32, which have the upright structures and inverted structures, respectively, may be different. The height-to-width ratios may be specifically set according to different requirements.

In some embodiments, each super-lens unit 3 includes a plurality of super-lenses; each pixel island includes a plurality of pixel units, and the plurality of super-lenses are in one-to-one correspondence with the plurality of pixel units. Micro-lenses are nano-scale devices that are much smaller in size than conventional geometric optical lenses; a size of each micro-lens may be equivalent to a size of each pixel unit. It should be understood that there is a certain gap between any adjacent two of the plurality of pixel units in each pixel island, and the light emitted from each pixel unit is emitted at a Lambertian angle, which will certainly have a certain effect on its adjacent pixel units. Specifically, although the colors of the light beams emitted from the pixel units in each pixel island are the same, when the light beam of a pixel unit in the pixel island is emitted to its adjacent pixel units, a light beam will by formed by crosstalk between two light beams having a same color, so that the formed images overlap each other, and the problems of visual ghosting, contrast reduction and the like will occur. In the embodiment of the present disclosure, the super-lenses are in one-to-one correspondence with the pixel units, and the light emitted by the pixel units are converged through the corresponding super-lenses, so that the light crosstalk between different pixel units may be avoided, and the display definition may be effectively improved.

Depending on a specific type of the near-to-eye display device, in some embodiments, the super-lenses in each super-lens unit may all correspond to pixel units of the same color, that is, the super-lens unit corresponds to a single-color pixel island. Alternatively, the super-lenses of each super-lens unit may also correspond to pixel units of different colors, respectively, that is, the super-lens unit corresponds to a full-color pixel island.

In some embodiments, the nano-pillars 32 each have a height-to-width ratio in a range from 3:1 to 12:1. Experimental data shows that when the height-to-width ratio of each of the nano-pillars 32 is within the above range, the light receiving effect of a display island is good, and the problems of the stray light with the crosstalk and the transparent stray light in the near-to-eye display device may be substantially solved. Further, in some embodiments, the height-to-width ratio of each of the nano-pillars 32 is 5:1.

In some embodiments, a height of each of the nano-pillars 32 is in a range from 350 nm to 550 nm, and the radius of each of the nano-pillars 32 is in a range from 45 nm to 95 nm. On the basis of meeting the range of the height-to-width ratio of the nano-pillars 32, the nano-pillars 32 with the above dimensions (including the height, radius and the like) can meet the requirement of light convergence, and not bring a greater pressure on the existing production process, and has a higher feasibility.

Optionally, a refractive index of each super-lens is greater than 1.7, so as to ensure the light outgoing efficiency of the whole micro-lens. Furthermore, the refractive index of each super-lens is in a range from 2 to 3.

In some embodiments, the near-to-eye display device further includes: a transparent substrate; the pixel islands and the micro-lenses are respectively fixed on two opposite sides of the transparent substrate; the super-lenses are positioned on a side of the transparent substrate close to (or proximal to) the pixel islands.

In some embodiments, the near-to-eye display device further includes: the transparent substrate 10, the pixel island array and the micro-lens array are fixed on two opposite sides of the transparent substrate, respectively, so that the micro-lens array and the pixel island array may be maintained relatively fixed. The transparent substrate means that the light transmittance of the substrate is not less than 85%. The material of the transparent substrate is not particularly limited herein, and the material of the transparent substrate may be SiNx (silicon nitride), silicon oxide (SiOx), SiOxNy (silicon oxynitride), or PMMA (polymethyl methacrylate), for example. Since PMMA has a small mass, when PMMA is used as the material of the transparent substrate, it is advantageous to reducing the weight of the near-to-eye display device.

Alternatively, the embodiments of the present disclosure are not limited to the above arrangement, as long as the micro-lens array and the pixel island array may be fixed with respect to each other. For example, clamps may be further provided around a first base substrate and a second base substrate, such that the micro-lens array and the pixel island array may be fixed with respect to each other by using the clamps.

It will be appreciated that a distance between a pixel island 11 and a corresponding micro-lens 12 does not exceed a focal length of the corresponding micro-lens 12, so that after the light emitted by the pixel island 11 illuminates on the corresponding micro-lens 12, the image displayed by the pixel island 11 forms an enlarged virtual image on a side of the pixel island 11 distal to the corresponding micro-lens 12. Here, the distance between the pixel island 11 and the corresponding micro-lens 12 refers to a vertical distance from the pixel island 11 to the corresponding micro-lens 12. When the distance between the pixel island 11 and the corresponding micro-lens 12 is equal to the focal length of the corresponding micro-lens 12, a light outgoing surface of the pixel island 11 is located on a focal plane of the corresponding micro-lens 21. In practical applications, the distance between the pixel islands 11 and the corresponding micro-lenses 12 may be set to a desired value by setting a thickness of the transparent substrate.

In some embodiments, a shape of an orthogonal projection of each pixel island 11 on the transparent substrate is square. Each pixel island 11 includes a plurality of pixels. For example, each pixel island 21 includes 10×10 pixels, and the pixels in a same pixel island 21 may emit light of a same color. Each pixel includes an OLED (Organic Light-Emitting Diode) device or a micro-LED (micro-Light-Emitting Diode) device.

The micro-LED may also be called a micro-LED crystal grain or a micro-LED chip, and mainly includes a p-type semiconductor layer, a light emitting layer and an n-type semiconductor layer which are sequentially stacked together. In addition, the micro-LED further includes a p-electrode electrically connected to the p-type semiconductor layer and an n-electrode electrically connected to the n-type semiconductor layer.

The OLED device may generally include an anode, a cathode, and a light emitting functional layer disposed between the anode and the cathode. The light emitting functional layer may specifically include: a hole injection layer, a hole transport layer, a light emitting layer, an electron transport layer, and an electron injection layer.

A shape of each micro-lens 12 in the embodiment of the present disclosure is not particularly limited, and the shape of each micro-lens 12 may be circular, square, hexagonal, or the like. Here, the shape of each micro-lens 12 refers to a shape of an orthogonal projection of the micro-lens 12 on the transparent substrate. In the present disclosure, as an example, the shape of each micro-lens 12 is circular. In this case, a diameter of each of the micro-lenses 12 is between 30 μm and 10 mm. For example, the diameter of each of the micro-lenses 12 is 500 μm or 1 mm or 2 mm. A distance between two adjacent micro-lenses 12 in a same row and a distance between two adjacent micro-lenses 12 in a same column are each between 0 to 10 mm, for example 500 μm or 1 mm or 2 mm.

In some embodiments, at least two adjacent micro-lenses 12 have a spacing region therebetween, so that ambient light may enter human eyes from the spacing region between the micro-lenses 12, so that the human eyes may see the image displayed by the pixel islands 11 and the ambient environment at the same time, thereby achieving the augmented reality effect. In the present disclosure, "two adjacent micro-lenses 12" means that there are no other micro-lenses 12 between the two micro-lenses 12.

In some embodiments, the micro-lenses may be arranged in any one of the following ways: in even rows, every two adjacent micro-lenses 12 have no space therebetween, that is, a distance therebetween is 0, in odd rows, a distance between every two adjacent micro-lenses 12 may be equal to the diameter of each micro-lens 12; in odd columns, every two adjacent micro-lenses 12 have no space therebetween, that is, a distance therebetween is 0, in even columns, a distance between every two adjacent micro-lenses 12 may be equal to the diameter of each micro-lens 12.

It will be appreciated that the predetermined viewing position, the center of a pixel island 11, the center of the micro-lens 12 corresponding to the pixel island 11, and the center of the micro-lens unit corresponding to the pixel island 11 are located on a same straight line, so that the light emitted from the pixel island 11 to the corresponding micro-lens 12 may pass through the corresponding micro-lens unit 3. In addition, the arrangement of the micro-lens units 3 may be the same as that of the micro-lenses 12. When a shape of the overall contour of each micro-lens unit 3 is the same as the shape of the corresponding pixel island 11, and both are square, in the micro-lens units 3, every two adjacent micro-lens units 3 in the even rows have no space therebetween, that is, a distance therebetween is 0, a distance between every two adjacent micro-lens units 3 in the odd rows may be equal to a width of each micro-lens unit 3; every two adjacent micro-lens units 3 in the odd columns have no space therebetween, that is, a distance therebetween is 0, a distance between every two adjacent micro-lens units 3 in the even columns may be equal to the width of each micro-lens unit 3.

It should be noted that the number and arrangement of the micro-lenses 12 in FIG. 5 are only exemplary, and in practical applications, other numbers and arrangements of the micro-lenses 12 may also be adopted. In addition, the outer contour shape of each micro-lens unit 3 is not limited to the square shape described above, and may be the same shape as the shape of each micro-lens 12, for example, a circle; or other shapes, such as a hexagon, etc., may also be used, as long as the light from the pixel islands 11 toward the corresponding micro-lenses 12 may be completely received by the corresponding micro-lens units 3.

The embodiment of the present disclosure also provides a wearable apparatus, which includes the near-to-eye display device provided in any one of the above embodiments; in addition, the wearable apparatus further includes a housing, and the near-to-eye display device is arranged on the housing. The housing may be a helmet, a spectacle frame (i.e., glasses frame), or the like.

The near-to-eye display device provided by any one of the above embodiments may eliminate the problems of color crosstalk and color difference stray light between single-color pixel islands, thereby improving the imaging effect, and improving the light emitting efficiency of the near-to-eye display device to further improve the imaging effect, so that the wearable apparatus adopting the near-to-eye display device can improve the user experience.

It should be noted that in the present disclosure, relational terms, such as "first," "second", and the like, are used solely to distinguish one entity or action from another entity or action without necessarily requiring or implying any actual such relationship or order between such entities or actions. Also, the terms "comprises," "includes," or any other variation thereof, are intended to cover a non-exclusive inclusion, such that a process, method, article, or apparatus that contains a list of elements not only contains those elements but also may contain other elements not expressly listed or inherent to such process, method, article, or apparatus. Without further limitation, an element defined by the phrase "comprising/including" does not exclude the presence of other identical elements in the process, method, article, or apparatus comprising/including the element.

In accordance with the embodiments of the present disclosure, as set forth above, these embodiments are not intended to be exhaustive or to limit the present disclosure to the specific embodiments described. Obviously, many modifications and variations are possible in light of the above description. The embodiments were chosen and described in the description, in order to better explain the principles of the present disclosure and the practical application, to enable one of ordinary skill in the art to better utilize the present disclosure and various modifications based on the present disclosure. The present disclosure is to be limited only by the claims and their full scope and equivalents.

What is claimed is:

1. A near-to-eye display device, comprising: a plurality of pixel islands and a plurality of micro-lenses in one-to-one correspondence with the plurality of pixel islands; wherein each pixel island is configured to emit light to a corresponding micro-lens so that the light reaches a predetermined viewing position after passing through the corresponding micro-lens; wherein the near-to-eye display device further comprises:

a plurality of super-lens units each comprising at least one super-lens; wherein the plurality of super-lens units are in one-to-one correspondence with the plurality of pixel islands; each super-lens unit is on a side of a corresponding pixel island proximal to the corresponding micro-lens, and an orthogonal projection of the super-lens unit on a plane where the corresponding pixel island is located covers the corresponding pixel island; the super-lens unit is configured to converge light, which is within a predetermined angle, emitted by the corresponding pixel island, so as to reduce a diffusion angle of the light emitted by the corresponding pixel island;

wherein each super-lens comprises a base substrate and a plurality of nano-pillars on the base substrate, both ends of each of the plurality of nano-pillars are a wide end and a narrow end, respectively, the plurality of nano-pillars comprise upright structures and inverted structures that are mixed and arranged alternately on the base substrate, the upright structures refer to the nano-pillars with wide ends proximal to the base substrate, and the inverted structures refer to the nano-pillars with narrow ends proximal to the base substrate.

2. The near-to-eye display device of claim 1, wherein each super-lens unit comprises a plurality of super-lenses, each pixel island comprises a plurality of pixel units, and the plurality of super-lenses are in one-to-one correspondence with the plurality of pixel units.

3. The near-to-eye display device of claim 2, wherein each pixel unit comprises an organic light-emitting diode device or a micro-light emitting diode device.

4. The near-to-eye display device of claim 2, wherein a distance between each pixel island and the corresponding micro-lens does not exceed a focal length of the corresponding micro-lens.

5. The near-to-eye display device of claim 1, wherein a height-to-width ratio of each of the nano-pillars is in a range from 3:1 to 12:1.

6. The near-to-eye display device of claim 5, wherein the height-to-width ratio of each of the nano-pillars is 5:1.

7. The near-to-eye display device of claim 5, wherein the nano-pillars each have a height in a range from 350 nm to 550 nm and a radius in a range from 45 nm to 95 nm.

8. The near-to-eye display device of claim 5, wherein each super-lens has a refractive index greater than 1.7.

9. The near-to-eye display device of claim 8, wherein a material of the nano-pillars comprises silicon nitride.

10. The near-to-eye display device of claim 5, wherein a distance between each pixel island and the corresponding micro-lens does not exceed a focal length of the corresponding micro-lens.

11. The near-to-eye display device of claim 1, further comprising a transparent substrate, wherein the plurality of pixel islands and the plurality of micro-lenses are respectively fixed on two opposite sides of the transparent substrate; and the plurality of super-lenses are on a side of the transparent substrate proximal to the plurality of pixel islands.

12. The near-to-eye display device of claim 11, wherein a distance between each pixel island and the corresponding micro-lens does not exceed a focal length of the corresponding micro-lens.

13. The near-to-eye display device of claim 1, wherein the plurality of super-lens units are arranged in an array; the plurality of micro-lenses are arranged in an array; a distance between any adjacent two of the plurality of micro-lenses is between 0 mm and 10 mm; and a distance between two adjacent micro-lenses in a same column is between 0 mm and 10 mm.

14. The near-to-eye display device of claim 13, wherein a distance between each pixel island and the corresponding micro-lens does not exceed a focal length of the corresponding micro-lens.

15. The near-to-eye display device of claim 1, wherein a diameter of each of the micro-lenses is in a range from 30 μm to 10 mm.

16. The near-to-eye display device of claim 15, wherein a distance between each pixel island and the corresponding micro-lens does not exceed a focal length of the corresponding micro-lens.

17. The near-to-eye display device of claim 1, wherein a distance between each pixel island and the corresponding micro-lens does not exceed a focal length of the corresponding micro-lens.

18. The near-to-eye display device of claim 1, further comprising: a base substrate; the micro-lenses are on a side of the base substrate distal to the pixel islands.

19. The near-to-eye display device of claim 18, wherein the micro-lenses and the base substrate have a one-piece structure.

20. A wearable apparatus, comprising the near-to-eye display device of claim 1.

* * * * *